United States Patent [19]

Bauer et al.

[11] Patent Number: 4,949,422
[45] Date of Patent: Aug. 21, 1990

[54] CONNECTING MEMBER FOR A WIPER BLADE AND A WIPER ARM

[75] Inventors: Kurt Bauer, Ingersheim; Eckhardt Schmid, Bietigheim-Bissingen, both of Fed. Rep. of Germany

[73] Assignee: SWF Auto-Electric GmbH, Bietigheim-Bissingen, Fed. Rep. of Germany

[21] Appl. No.: 277,495

[22] Filed: Nov. 29, 1988

Related U.S. Application Data

[63] Continuation of Ser. No. 100,508, Sep. 24, 1987, abandoned.

[30] Foreign Application Priority Data

Sep. 26, 1986 [DE] Fed. Rep. of Germany ....... 3632733

[51] Int. Cl.$^5$ ............................................... B60S 1/40
[52] U.S. Cl. .................................................. 15/250.32
[58] Field of Search ............ 15/250.31, 250.32, 250.33

[56] References Cited

U.S. PATENT DOCUMENTS

| | | | |
|---|---|---|---|
| 3,641,614 | 2/1972 | Newsome | 15/250.32 |
| 3,845,519 | 11/1974 | Quinlan | 15/250.32 |
| 3,875,611 | 4/1975 | Plisky | 15/250.32 |
| 4,224,001 | 9/1980 | Arndt | 15/250.32 X |
| 4,240,177 | 12/1980 | Harbison | 15/250.32 |
| 4,324,019 | 4/1982 | Mohnach | 15/250.32 |
| 4,389,746 | 6/1983 | Kimber | 15/250.42 X |
| 4,608,728 | 9/1986 | Sumins | 15/250.32 |
| 4,670,934 | 6/1987 | Epple et al. | 15/250.32 |

FOREIGN PATENT DOCUMENTS 1293926 10/1972 United Kingdom ............ 15/250.32

*Primary Examiner*—Harvey C. Hornsby
*Assistant Examiner*—K. O'Leary
*Attorney, Agent, or Firm*—Robert P. Seitter

[57] ABSTRACT

This invention relates to a connecting member for a wiper blade and a wiper arm including a plastic structural member and a metallic locking spring. The structural member has a bearing bore as a receiver for a pivot pin. The locking spring is retained at a first end portion and intersects the bearing bore and acts upon the pivot pin by means of its center area. A second end portion of the spring forms a release key positioned behind the bearing bore. The release key of the locking spring is covered by a wing which is intergrally formed as part of the wall of the structural member by means of a film hinge.

8 Claims, 2 Drawing Sheets

CONNECTING MEMBER FOR A WIPER BLADE AND A WIPER ARM

This application is a continuation of application Ser. No. 100,508, filed Sept. 24, 1987, abandoned.

BACKGROUND OF THE INVENTION

This invention relates to a connecting member for a wiper blade and a wiper arm.

In a known connecting member of this kind, the locking spring is metal. In a first portion the locking spring has a substantially U-shaped bend with two shanks normally spaced apart. The bend is braced in a substantially box-shaped structural unit between two holding walls which extend perpendicularly downwards in front of a bearing bore from a back wall of the structural unit arranged on the upper side of the connecting member. The locking spring extends in the longitudinal direction of the structural unit and intersects the bearing bore in an area which is farther from the back wall of the structural unit than the axis of rotation of a wiper arm pivot pin. When the pivot pin is fitted in the bearing bore, the locking spring thus rests against the underside of the pivot pin. At the rear of the bearing bore the locking spring has a second substantially U-shaped bend. This second bend projects through an opening in the back wall of the structural unit and includes a planar base which functions as a release key. Thus the locking between the pivot pin and the connecting member can be released simply by pressing the release key downwards. Due to the fact that the locking spring extends through an opening in the back wall of the structural unit, dirt, water and ice can easily enter the connecting member adversely effecting articulation and the service life of the locking spring particularly if the locking spring is not made from a noncorrosive material. Moreover this particular connecting member does not meet stylistic requirements.

SUMMARY OF THE INVENTION

It is an object of the present invention to provide a connecting member of this general kind which assures articulation of the wiper for a substantially long time, and which can be serviced easily.

This object is achieved according to the invention by providing a connecting member which includes a covering for the release key of the locking spring in the form of a wing. Dirt, water or ice are prevented from entering the connecting member and adversely affecting the quality of the articulation. The release key of the locking spring can nevertheless still be easily operated without difficulty because the wing is adapted to be tilted upwards by turning it about a joint whereupon the release key is exposed and can thereafter be operated. According to an important feature, if the locking spring of the connecting member is located to intersect the bearing bore in a section of the bore which is farther from the upper end than the geometric axis of the pivot pin the locking action between the locking spring and the pivot pin can be released by applying pressure onto the release key in downward direction. Advantageously, the wing need not be tilted away to operate the release key, rather pressure can be exerted onto the release key directly by means of the wing.

According to one important feature, the wing can then be supported directly on the release key. According to the invention the wing only loosely rests upon the release key and there is accordingly no risk for the locking action between the locking spring and the pivot pin of the connecting member, to be inadvertently weakened or released by the pressure of the wing itself. Advantageously, this structure of the connecting member provides for easy and rapid release of the locking action because there is no large space between the wing and the release key to be transversed by the wing to reach the release key.

According to another feature of the invention, an uneven surface on the wing improves operationability of the wing for releasing the joint connection by reducing slippage of one's finger off the wing.

Another feature of the invention provides for the wing to be integrally formed as part of the structural unit by way of a film hinge. Advantageously, there is provided a particularly reliable attachment of the wing to the structural unit. Moreover no separate die is needed for its production and it need not be mounted separately onto the structural unit.

While the wing can be hinged at any place on the structural unit, in order to prevent if from being made larger than necessary for its function, an arrangement wherein it is hinged to a back wall of the unit is preferred and according to one embodiment, the wing is hinged to the rear end of the back wall. This arrangement is particularly advantageous when the structural member is longer than wide. In this embodiment, the wing is long and can accordingly be deflected without difficulty, particularly if the release key of the locking spring is made to penetrate the bearing bore approximately centrally.

According to a still further important feature of the invention, the wing projects beyond the adjacent areas of the structural member, so that it can be easily seen and located as well as easily operated.

Another important feature provides for the bearing bore to extend over the entire width of the back wall to form a large-area receiver for the pivot pin. Accordingly, the integrity and security of the joint connection is increased. Also, a low overall height of the connecting member is achieved with this structure which contributes to increased reliability of the joint connection because there is little risk for the connecting member to be tilted or buckled by transverse forces.

Still another feature provides for a stop on the structural member contacting the wiper blade and preventing it from turning freely relative to the wiper arm.

BRIEF DESCRIPTION OF THE DRAWING

Further advantageous details and constructions of the invention will be understood from the Detailed Description of the Preferred Embodiment and the drawing in which.

DETAILED DESCRIPTION OF PREFERRED EMBODIMENTS

Figure 1:
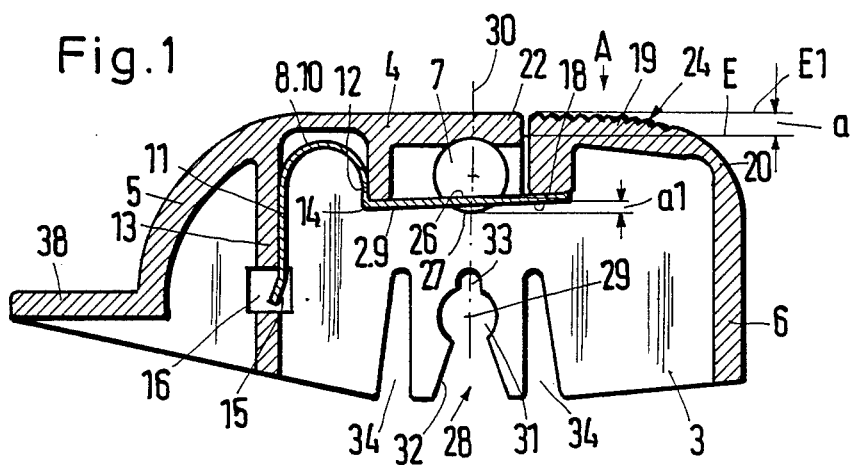
FIG. 1 is a longitudinal cross section through a connecting member according to the invention.

The connecting member according to the invention includes a substantially box-shaped structural member 1 made from a resilient plastic material and a metallic locking spring 2. The structural member 1 has two side walls 3 extending with a lateral spacing in parallel to each other in the longitudinal direction of the connecting member. The side walls are connected alongside their upper edges by a back wall 4, at their front ends by a front wall 5 and at their rear ends by a rear wall 6 located approximately midway along the length of the structural member 1. Extending transversely to the longitudinal direction of the connecting member in close proximity to the upper edges of the side walls 3 is a bearing bore 7. The bore extends through the side walls 3 and over a certain part of the height of the back wall 4, as shown in FIG. 1. The bearing bore 7 serves as a receptacle for an insertable pivot pin 100 shown in FIG. 5 which projects laterally from a wiper arm 110.

The locking spring 2 serves to axially secure the position of the pivot pin 100 in the bore. The spring intersects the bearing bore 7 and cooperates in well known manner with a groove 101 and the pivot pin 100. The locking spring 2 locks the pivot pin 100 reliably with the structural member 1 even after extended periods of operation.

Figure 2:
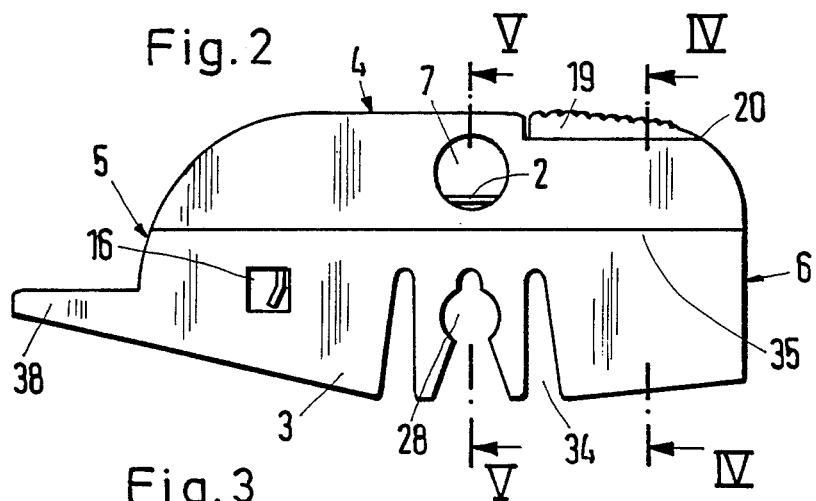
FIG. 2 is a lateral view of the connecting member.

The locking spring 2 has a first portion substantially formed as a U-shaped bend 10 and a second planar portion 9. The spring is arranged on the structural member 1 in such a way that its U-curvature 10 is adjacent to the back wall 4. Two U-shanks 11 and 12 of the locking spring 2 are braced between two holding ribs 13 and 14 of the structural member 1. The ribs are in front of the bearing bore 7 and extend in parallel perpendicularly downwards from the back wall 4. The holding rib 13 is closer to the front wall 5 and extends across the entire height of the structural member 1. The U-shank 11 of the locking spring 2 rests against the holding rib 13, is longer than the other U-shank 12 and is bent at its lower end forming a bent fixing nose 15. The fixing nose 15 engages in an opening 16 which extends transversely across the entire width of the structural member 1 as shown in FIGS. 1 and 2. Thus, when the structural member 1 is produced, the opening 16 can be made by injection-molding by means of a mold slide without any problem.

The second portion 9 of the locking spring 2 intersects the bearing bore 7 in the area farther away from the back wall 4 than does the geometric axis 17 of the pivot pin 100. The locking between the pivot pin 100 and the structural member 1 may thus be detached by pressure in the direction of arrow A in FIG. 1. The outer end 18 of the straight portion 9 of the locking spring 2 represents the release key of the locking spring 2. When the pivot pin 100 is removed the locking spring 2 springs back to its rest position shown in FIG. 1.

Figure 3:
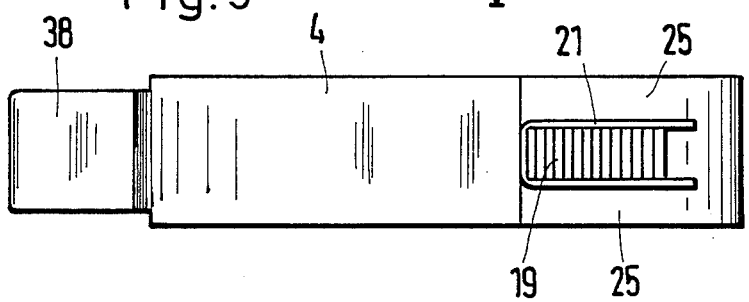
FIG. 3 is a top view of the connecting member.
Figure 4:
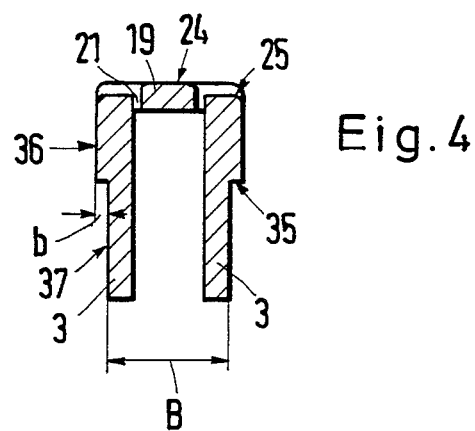
FIG. 4 is a cross section taken along the line IV—IV of FIG. 2.

It is important that the release key 18 of the locking spring 2 be covered, so that dirt, water or ice cannot enter the connecting member to reduce the danger of corrosion of the connecting member and the pivot pin 100. The release key 18 is thereby covered from above by a substantially cuboid shaped wing 19 integrally formed onto the end area of the back wall 4 by way of a film hinge 20 which extends transversely to the longitudinal direction of the structural member 1 and from which end area the rear wall 6 extends in a downward direction as shown in FIG. 1. The wing 19 extends in the longitudinal direction of the structural member 1 across an aperture 21 of the back wall 4 as best shown in FIGS. 3 and 4. As shown in FIG. 1 the wing is slightly curved upwards extending from the film hinge above the locking spring 2 to an area 22 of the back wall 4 close behind the bearing bore 7. At its front end opposite the film hinge 20 the wing 19 has a stud 23 directed downwards which has a rectangular cross section. The wing 19 is detachably positioned on the release key 18 of the locking spring 2 by means of the stud 23. The outside area 24 of the wing 19 facing away from the locking spring 2 has a plurality of transverse grooves. As shown in FIGS. 1 and 3 the area 24 of the stud 23 which faces away from the locking spring 2 extends laterally in a plane E1 which is positioned above a lateral plane E in which depressed areas 25 of the sections of the back wall 4 lie. As shown in FIG. 1, the areas 24 and 25, or the planes E and E1, respectively, have a perpendicular spacing from each other which is larger than the perpendicular spacing a1 between the upper surface 26 of the locking spring 2 and the lower section 27 of the generated surface of the bearing bore 7. Thus the spacing a between the planes E and E1 is larger than the locking stroke between the locking spring 2 and the pivot pin 100. The locking between the pivot pin 100 and the locking spring 2 can be easily released by exerting finger pressure in the direction of arrow A in FIG. 1 onto the stud 23 of the wing 19 thus transmitting the pressure onto the release key 18 of the locking spring 2. The film hinge 20 thereby allows the wing 19 to be easily deflected and the grooved surface 24 prevents the operator's finger from slipping. Due to the fact that the surface 24 of the wing 19 projects over the back wall surfaces 25, the wing 19 may be deflected by a finger without the help of any tool. As shown in FIGS. 1 and 2 the area 24 of the wing 19 adjoins the other areas of the back wall 4 and is slightly curved upwards in the longitudinal direction of the structural member without any steps. Thus the connecting member ensures a permanent, reliable locking between the pivot pin 100 and the structural member 1 with a pleasing shape and with the capability to have its locking released easily, if required.

Figure 5:
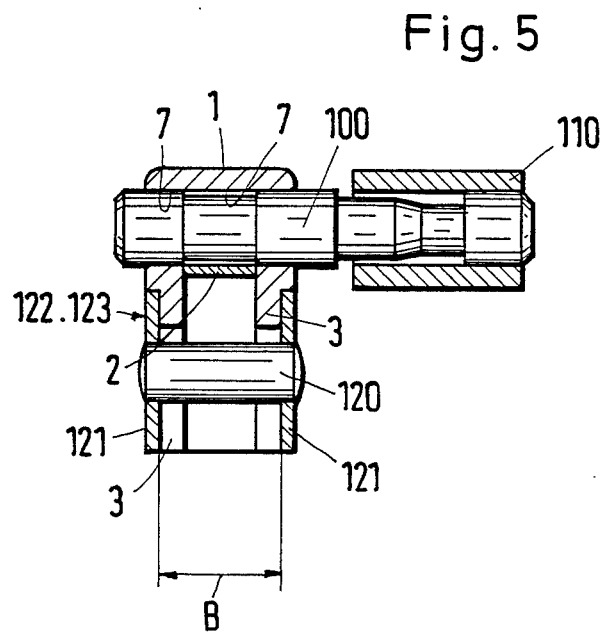
FIG. 5 is a partial cross-sectional view taken along V—V of FIG. 2 showing the connecting member mounted on a wiper blade and wiper arm.

As shown in FIG. 5, the connecting member has a locking recess 28 for receiving a wiper blade pivot pin 120 which connects to a wiper blade 123. The pivot pin 120 extends in a known manner between two side walls 121 of a wiper blade main yoke 122. As shown in FIG. 1, the locking recess 28 is provided in the side walls 3 of the structural member 1 in such a way that the geometric axis 29 of the wiper blade pivot pin 120 is below the geometric axis 17 of the wiper blade pivot pin 100 and is located approximately midway along the height of the structural member 1 on a line 30 intersecting the back wall 4. The recess 28 is open in a downward direction in FIG. 1. An upper area 31 of the recess is circular with a diameter adapted to receive the wiper blade pivot pin 120. The recess 28 widens in its lower area 32 so that it can without difficulty be fitted on the wiper blade pivot pin 120 from above. Each of the side walls 3 have a cutout 33 above the locking recess 28. In addition, the side walls 3 have a cutouts 34 both in front of and behind the locking recess 28 each extending approximately across one half of the height of the structural member 1. The cutouts 33 and 34 permit the locking recess 28 to spring-act without any difficulty when the connecting member is mounted on the wiper blade pivot pin 120.

As shown in FIGS. 2, 4 and 5 the lower two thirds of the side walls 3 of the structural member 1 have a smaller outer spacing B from each other than the upper one third. The change in spacing forms a step 35. The spacing B corresponds to the spacing between the interior surfaces of the side walls 121 of the wiper blade supporting yoke 122 and the width b of each step 35 corresponds to the width of each supporting yoke side wall 121. When the connecting member is mounted on the wiper blade pivot pin 120, the steps 35 are positioned on the upper edges of the side walls 121 and the outer surfaces of the side walls 121 are flush with the outer surfaces 36 of the upper areas of the side walls 3, whereas the outer surfaces 37 of the lower two thirds of the side walls 3 are flush against the interior surfaces of the side walls 121 of the wiper blade supporting yoke 122.

As FIGS. 1, 2 and 3 show, the lower end of the front wall 5 includes an integrally formed elongation 38 extending forward, to the left in FIG. 1, in the longitudinal direction of the structural member. The elongation 38 forms a stop for the web of the wiper blade supporting yoke 122, not shown in the drawing, which web connects the side walls 121 alongside the upper edges in front of and behind the area where the connecting member extends. The stop prevents the wiper blade from freely turning relative to the wiper arm and thus prevents the wrong side of the wiper from resting upon the window pane after having been tilted off during cleaning of the pane.

What is claimed is:

1. A connecting member for a wiper blade and a wiper arm comprising, in combination:
    a housing having side walls connected by a back wall;
    an opening in said housing providing a bearing bore extending therethrough and bounded by each of said walls;
    a pivot pin inserted in said bore and extending away from said housing for receiving a wiper arm thereon and said pin having a recessed portion intermediate the ends thereof;
    a locking spring mounted in said housing and extending across a portion of said bore and being received said recessed portion of said pivot pin in said bore;
    a deflectable member mounted on said back wall for movement toward and away from said spring for engaging and moving a portion of said spring and being arranged for moving said spring out of said recessed portion to permit removal of said pivot pin from said housing; and,
    a second opening provided on said housing for releasably receiving a wiper blade member therein.

2. The connecting member according to claim 1, wherein said second opening comprises a pair of locking recesses respectively provided on said side walls.

3. The connecting member according to claim 1, wherein said deflectable member comprises a tab integrally formed in said back wall and being connected at one end thereof to said housing.

4. The connecting member according to claim 3, wherein said tab is connected to said housing by a film hinge.

5. The connecting member according to claim 4, wherein said tab is provided with outwardly facing grooved surface.

6. The connecting member according to claim 5, wherein said grooved surface is provided in a plane extending parallel to and above the plane of the adjacent portions of said back wall.

7. The connecting member according to claim 1, wherein said deflectable member includes a projecting portion extending into said housing for engaging said locking spring.

8. A connecting member for a wiper blade and a wiper arm comprising, in combination:
    a housing having side walls connected by a back wall;
    an opening in said housing providing a bearing bore extending therethrough and bounded by each of said walls;
    a pivot pin inserted in said bore and extending away from said housing for receiving a wiper arm thereon and said pin having a recessed portion imtermediate the ends thereof;
    a locking spring mounted in said housing and extending across a portion of said bore said locking spring being mounted at one end thereof to said housing along one side of said bore and being received within said recessed portion of said pivot pin in said bore; and
    a deflectable member mounted on and integrally formed with said back wall for movement toward and away from said spring for engaging and moving a portion of said spring which is located on an opposite side of said bore relative to said one side and said deflectable member being arranged for moving said spring out of said recessed portion to permit removal of said pivot pin from said housing.

* * * * *